Aug. 23, 1960     W. A. TUTHILL     2,949,976
ACTUATING AND CONTROLLING MEANS FOR EXPANSIBLE FILTERS
Filed May 29, 1958     4 Sheets-Sheet 1

INVENTOR
WILLIAM A. TUTHILL
BY
Kane, Dalsimer and Kane
ATTORNEYS

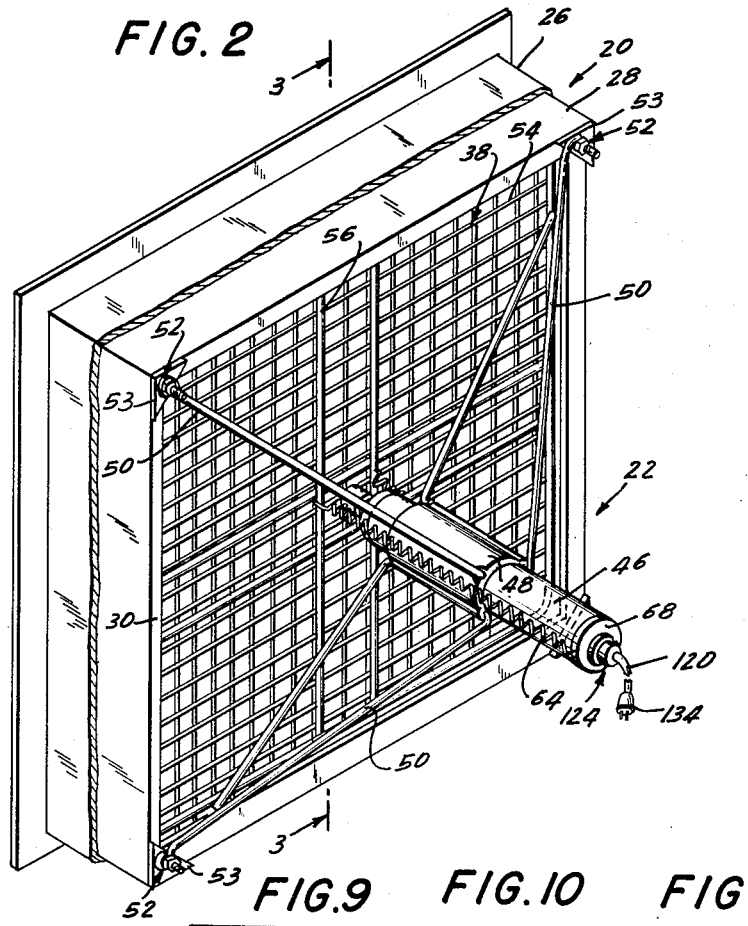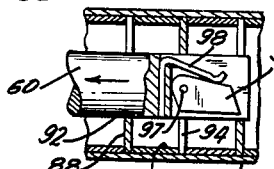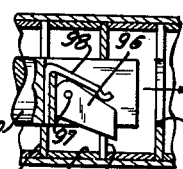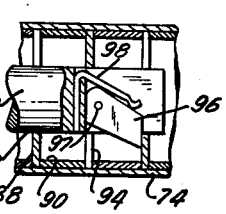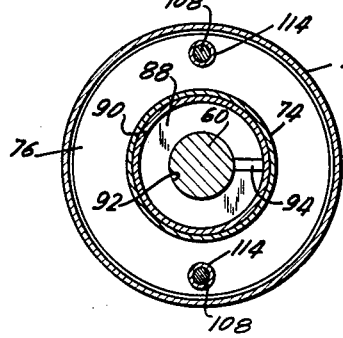

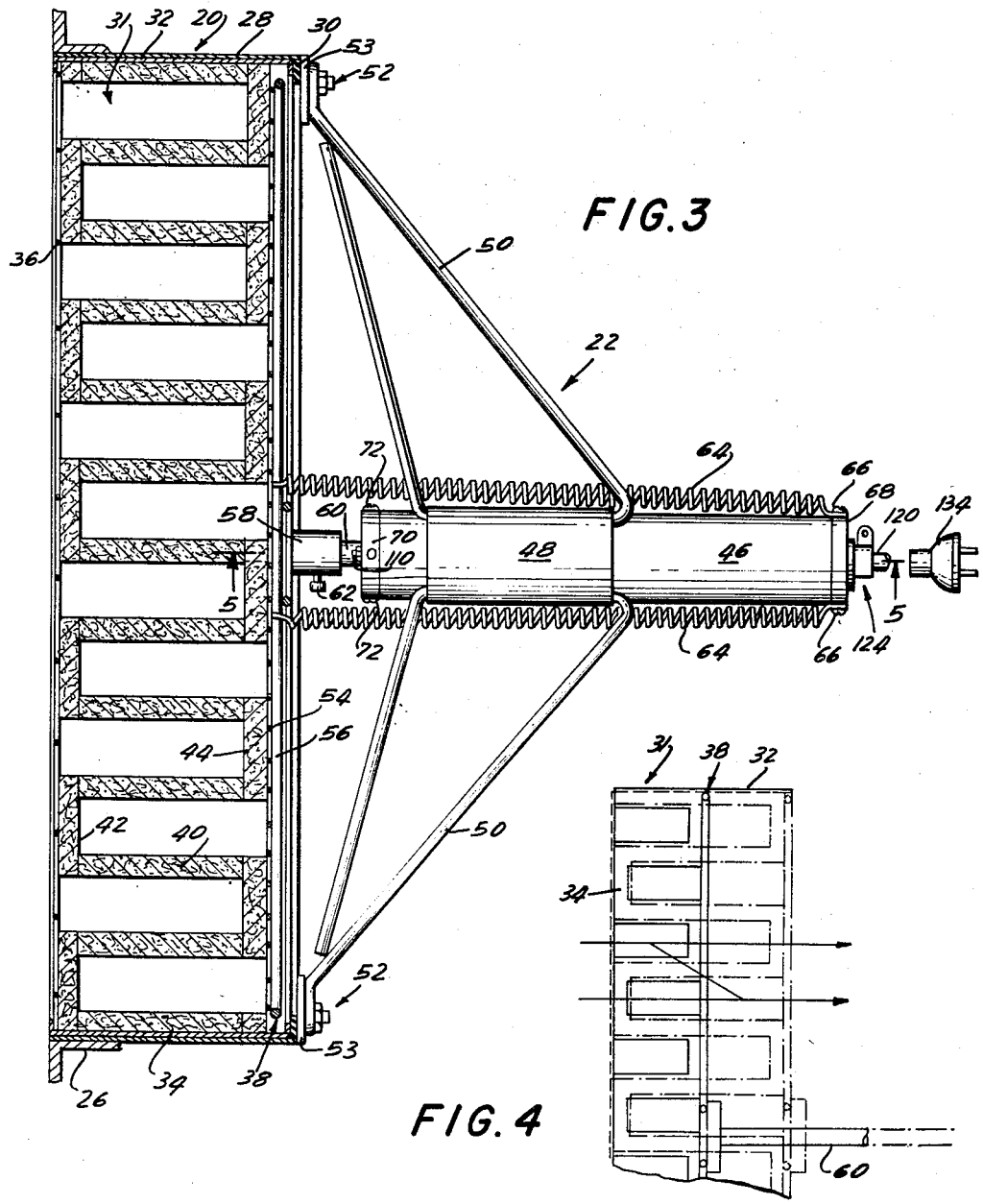

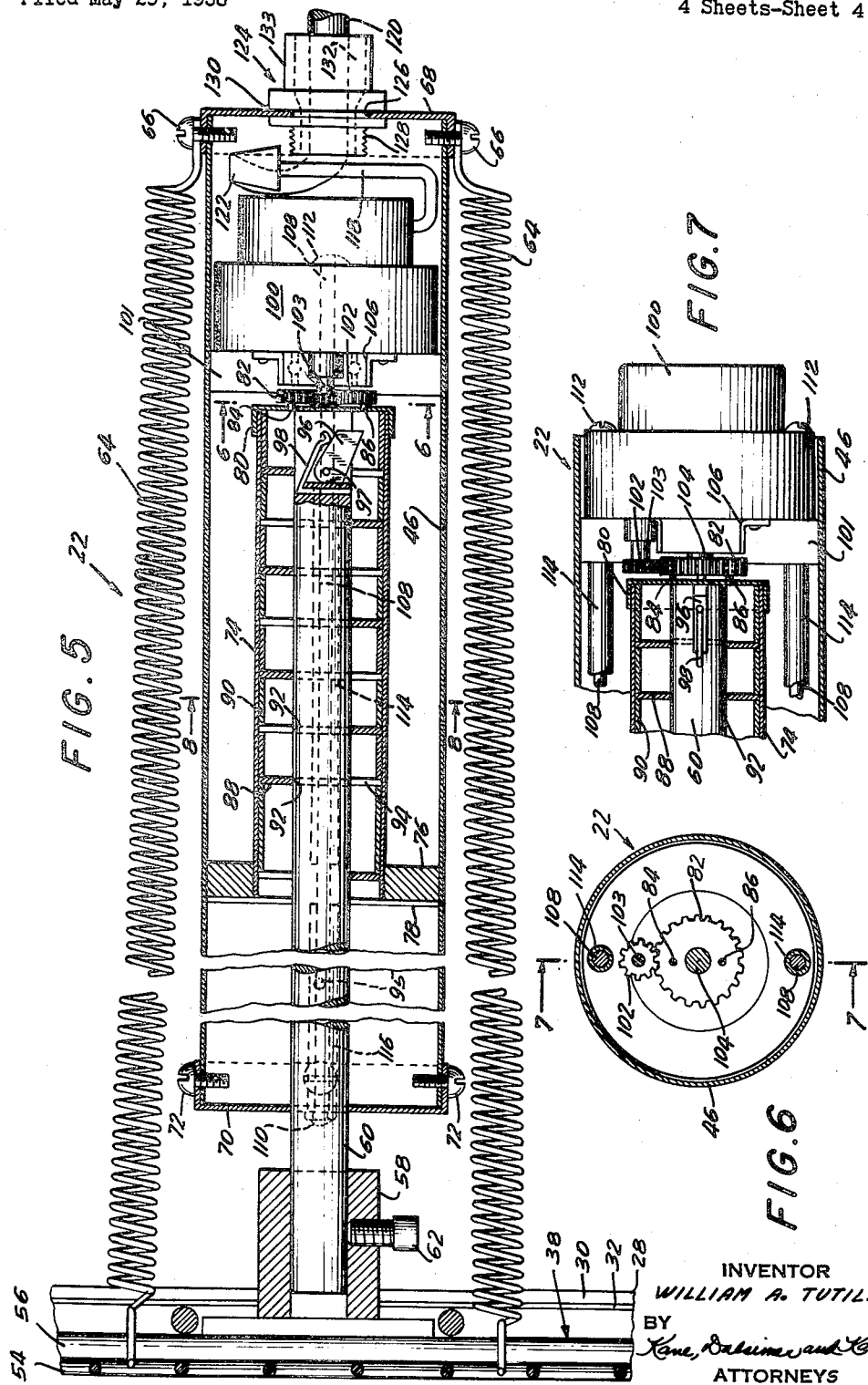

United States Patent Office 2,949,976
Patented Aug. 23, 1960

2,949,976

ACTUATING AND CONTROLLING MEANS FOR EXPANSIBLE FILTERS

William A. Tuthill, Westhampton Beach, N.Y., assignor to Flanders Mill, Inc., Riverhead, N.Y., a corporation of New York Filed May 29, 1958, Ser. No. 738,766

16 Claims. (Cl. 183—52)

This invention relates to expansible air filters, and more specifically, to an improved apparatus for automatically expanding the same. This application is a continuation-in-part of application Serial No. 638,338, filed February 5, 1957.

An object of this invention is to provide an improved actuating and controlling device for expansible filters which will automatically expand such filters upon occurrence of increased air pressure at the upstream side of the filter.

Another object is to provide an expansible air filter unit which will operate unattended and automatically, and more practically re-establish desirable air flow characteristics therethrough by being responsive to such characteristic changes due to impurity build-up on surfaces of the filter.

Still another object is to provide an improved expansible filter unit which is pressure-sensitive and which will react to pressure differentials between the upstream surfaces of the filter and downstream surfaces of the filter, as well as such upstream surfaces and the ambient atmosphere.

A further object is to provide an expansible dust filter system suitable for use under conditions where uniform air flow without additional power requirements is desirable throughout the life of the filter.

A still further object of this invention is to provide an expansible dust filter unit presenting prolonged filter life, especially when conditions do not necessitate constant air flow.

An important object is to provide for an increased filter life expectancy of more than three to four times that of other known filters operating under similar conditions.

Another important object is to provide a practical, inexpensive, easily installable, improved expansible filter unit together with individual components thereof.

In general, the present invention contemplates a compressible and expandable filter media within a filter frame. A tubular housing is secured to this frame and rotatably mounts a cam tube therein. A motor of the reduction gear type is additionally mounted in this tubular housing, with its drive shaft coupled with surfaces of said cam tube for imparting rotational movement to this tube. An elongated shaft is connected to the filter media through grill-work, and particularly extends into the housing as well as the cam tube. This elongated shaft has surfaces engageable with surfaces of bored washers, which are mounted within the cam tube. These washers are also provided with radial slots which provide access for those surfaces of the elongated shaft that normally engage surfaces of the washers. These surfaces of the shaft are adapted to encounter these slots and thus cooperate to shift this shaft relative to the tubular housing upon rotation of the cam tube relative to the elongated shaft. The motor for rotatably driving the cam tube is energized by means of a pressure-sensitive means operable upon experiencing a pre-set pressure differential. When the elongated shaft shifts relative to the tubular housing, the filter media expands.

With these and other objects in mind, reference is had to the attached sheet of drawings illustrating one form of the invention wherein like characters represent like parts, and in which:

Fig. 2 is a perspective view of the assembled expansible filter mechanism without the pressure-sensitive actuating means, as viewed from the downstream side of the mechanism;

Fig. 3 is a longitudinal sectional view taken along the line 3—3 of Fig. 2;

Fig. 4 is a partial schematic view illustrating the filter media expansion as well as the expansion principles involved for the filter media of the present invention;

Fig. 5 is an enlarged longitudinal sectional view taken along the line 5—5 of Fig. 3 for purposes of clearly illustrating the expanding mechanism of this invention;

Fig. 6 is an enlarged end sectional view of the expanded mechanism taken along the line 6—6 of Fig. 5 with certain parts removed;

Fig. 7 is an enlarged sectional view taken along the line 7—7 of Fig. 6;

Fig. 8 is a cross-sectional view of the expanding mechanism taken along the line 8—8 of Fig. 5;

Figs. 9, 10 and 11 are fragmentary sectional views illustrating the association of the shiftable shaft with the rotatable cam tube assembly.

The present invention, for purposes of this detailed description, may be taken to include a filter assembly 20, an expansion controlling or expanding mechanism 22, and a pressure-sensitive actuating means 24.

Figure 1:
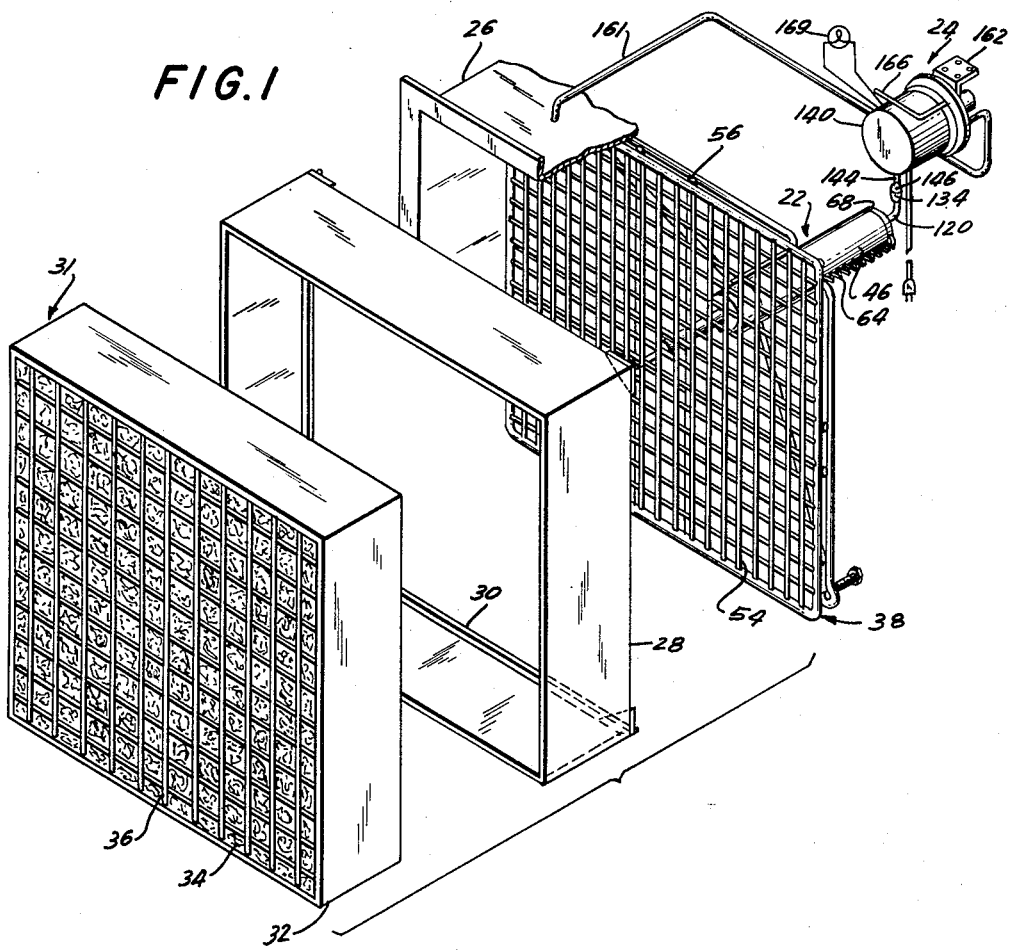
Fig. 1 is an exploded perspective view of an expansible filter unit according to the present invention, having certain parts broken away and removed, and viewed from the upstream side of the unit.

In Figs. 1, 2 and 3, one form of filter assembly 20 is illustrated, and is normally operatively associated with the control and actuating mechanisms of this invention. This assembly 20 is adapted to be received by an ordinary air duct 26 or effectively placed to accomplish the intended filtering function. The filter assembly 20 includes a permanent frame 28 which presents inwardly extending flanges 30. This permanent frame 28 is adapted to conveniently receive and embrace a filter pack 31 comprising replaceable frame 32. Filter pack 31 additionally includes a filter media 34 contained in the replaceable frame 32 together with a replaceable wire pack (also called the hardware cloth) 36 disposed within and along one of the filter pack's open ends. When the filter media 34 is installed, its downstream side is adapted to be compressed by grill-work 38 which is conveniently attached to the expanding mechanism 22.

The filter pad 31 may be held within the permanent frame 28 to be in attachment with flange 30 in any suitable manner, as for example, by a wing-nut arrangement (not shown). If desired, each filter media 34 can be sealed in its replaceable frame 32 by means of any suitable adhesive. The filter media 34 is preferably formed from resiliently compressible filter material such as Fiberglas, wool, cotton, felt, mineral wool, or the like. These materials are of such a character that on being released from a compressed condition they will expand, and when incorporated into a structure of the present invention, they embody such characteristics and dimensions that permit its expanded dimensions to completely fill the interior of replaceable frame 32, as clearly illustrated in Figs. 3 and 4.

It has been found that the low resistance filter life obtainable from very porous deep beds of fine diameter fibers could be greatly extended without sacrifice of retention efficiency by slightly expanding the filter bed each time air flow resistance increased beyond a predetermined maximum value. In practice, the filter bed is given initial compression equal to approximately one-third to one-half its expanded depth, substantially as illustrated in Fig. 4. Filtration takes place through the edges rather than the face of the compressed media. To greatly extend the filtration surface, the filter bed is preferably constructed with deep holes or channels which are ultimately blocked at the entering and leading faces by filter media. Air enters holes open at the upstream face and is prevented from by-passing the filter by the layer of filter medium located on the downstream face. Thus, dirt laden air passes through the filter medium laterally and leaves through passages open to this downstream side. The thickness of the walls dividing the passages constitutes the actual thickness of the filter bed.

When the filter is expanded after a period of use, the effective filter face area enlarges somewhat, breaking up the accumulated dust cake on the surface of the filter and restoring the effectiveness with the original high porosity inside the body of the filter. Under these conditions, the variable compression and expansible filter is found to give an extended life (without filter cleaning or filter removal) of at least three to four times that of a fixed bed filter. Progressive migration of the deposited aerosol occurs after each relaxation of the filter bed and dust quickly deposits deeper into the interstices of the fibers where permanent storage takes place with a negligible decrease in bed porosity and only a small increase in air flow resistance. The medium is able to retain its efficiency as it is expanded due to the filtration effect of the dust collected in the interstices of the medium.

A filter media 34 found to possess satisfactory characteristics accompanied by significant results comprises blankets 40 of Fiberglas having an overall thickness of approximately 8 inches and includes a series of punched-out 1½ inch square holes. Two pieces 42 and 44, ½ inch thick with holes located so as to close the panels in the 8 inch thick piece 40, are used to cover both faces of the filter pack. This results in air pockets having a depth equivalent to that illustrated in Figs. 3 and 4. The filter surface is the bottom surface and the inside walls of the inlet air passages of the 8 inch thick piece. Consequently, this filter media structure provides a relatively large filter surface compared to a relatively small face area.

The material constituting the filter medium 40, 42 and 44 may possess the same characteristics and be essentially the same, or may be different. A satisfactory combination of Fiberglas materials have been employed in which medium 40 provided an initial pressure drop across its faces of approximately .38" W.G. when compressed 50%. The mediums 42 and 44 were selected to provide an initial pressure drop across its faces of approximately a 46" W.G. when compressed 50%.

The expanding of expansion control mechanism 22 comprises a substantially tubular outer shell 46. This shell 46 suitably mounts a rod support clamp 48. Rigidly secured to shell 46, by means of clamp 48, are four support rods 50 attached to permanent frame 28 by means of a threaded stud and nut assembly 52 disposed at the four downstream corners of this permanent frame 28. Stud plates 53, secured to permanent frame 28, may mount the threaded stud of this assembly.

Referring now to the grill-work 38, it will be observed that this grill-work includes a masher wire 54 which is adapted to bear against the downstream side of the filter media 34. Along the outer face of this masher wire and located symmetrically, as well as centrally with respect thereto, is a masher frame 56.

A shaft hub 58 is suitably fixed to the masher frame 56 as by welding. A shiftable shaft 60 is secured within the bore of shaft hub 58 by means of a locking or set screw 62.

A pair of coiled springs 64 under tension are connected at one end to the masher frame 56 in any suitable manner such as welding or by a simple loop tie. The other ends of these springs 64 are attached to the tubular outer shell 46 by means of screws 66 which also function to retain bored end plate 68 on the downstream end of the tubular shell 46. A similar bored end plate 70 is secured to the other open end of tubular shell 46 by means of screws 72.

A cam tube 74 is coaxially and rotatably mounted within tubular shell 46. This mounting is provided by a center bearing 76 disposed adjacent the upstream end of the cam tube 74. A bored end plate 78 functions to close one end of cam tube 74, as well as cooperating to position this tube in shell 46. A cap 80 is mounted on the other end of this tube and securely mounts spur gear 82 by means of a pair of tabs 84 and 86 bent down from the cam bottom cap 80 into engagement with surfaces of holes drilled in this spur gear 82. Obviously, other means can be employed for preventing relative rotation between gear 82 and cap 80.

A plurality of washers 88 are mounted within cam tube 74 in spaced-apart relation by means of spacers 90. As shown, eight such washers are so disposed and are each formed with a center bore 92. Extending from this bore to the outer periphery of the associated washer is a radial slot 94. The shaft 60 is dimensioned to pass freely through the washer bores 92. A stop pin 95 extends from shaft 60 to limit the longitudinal displacement of shaft 60 in an upstream direction so that the free end of the shaft does not fall out of engagement with surfaces of the washer bores 92.

The free end of shaft 60 is provided with a spring-biased catch arrangement which includes catch arm 96, catch pin 97, and spring 98. Referring specifically to Fig. 9, it will be observed that this spring-catch arrangement permits shaft 60 to be displaced toward the left or upstream with respect to the expanding mechanism 22. Thus, shaft 60 may be shifted to the left or upstream to load or compress the filter 20 through grill-work 38 with catch 96 resting upon the upstream face or the washer 88 located next to the furthest one upstream. As shown, shaft 60 when in a loaded position may fall through seven separate drops. However, catch 96 is adapted to bear against the upstream face of washers 88 and thus prevent relative displacement of the shaft 60 with respect to the expanding mechanism 22 in the other or downstream direction, will be as viewed in Fig. 11. When catch 96 is in line with the associated or proximate radial slot 94, the shaft 60 will be urged to the right or downstream, substantially as illustrated in Fig. 10, under the influence of springs 64. As mentioned in the above, cam tube 74 is rotatable with respect to shaft 60. Consequently, when proximate washer slot 94 is not aligned with catch 96, rotation of cam tube 74 will render it possible to ultimately align the catch 96 with this washer slot 94. The slots 94 of each washer are preferably offset with respect to the slots of adjacent washers. Accordingly, when passing through the slot of one washer, catch 92 will engage the upstream face of the washer 88 next in line in a downstream direction. This relative movement or shifting results in an appreciable impact of arm 96 with the next downstream washer engaged because of the base of springs 64. The filter media 34 will expand due to this relative movement or shifting of shaft 60, which shifting is further enhanced by the inherent expansibility of the filter media 34. When the filter is expanded after a period of use, the effective filter face area enlarges and consequently breaks up the accumulated dust cake on the surfaces thereof.

The slots 94 for most commercial applications are preferably alternated or out of phase 180° with the immediately adjacent washer slots. Therefore, the cam tube 74 must traverse an angle of 180° before the catch 96 will pass through the next expansion step.

The rotation of cam tube 74 is imparted by a conventional geared-down electric motor 100. For most applications, a 4-watt electric motor (110 volt) rated at 1 r.p.m. has proven to be satisfactory. This motor 100 is mounted within shell 46 by a suitable motor mount 101. A pinion gear 102 is mounted on shaft 103 which extends from motor 100 and is meshed with spur gear 82. Gear 102 is thus permitted to transmit the rotational energy from motor 100 to cam tube 74 through gear 82. Spur gear 82 is mounted on a spur gear shaft 104, which is journaled in thrust bearing 106 which in turn is mounted on the housing of motor 100. This bearing 106, together with bearing 76, properly rotatably mounts cam tube 74 in shell 46. A pair of tie rods 108 extend between end plate 70 and motor 100 and are coupled therewith by tie rod nuts 110 and rod leads 112.

Tie rod bushings 114 and 116 function to maintain center bearing 76, plate 78 and motor immovable with respect to tubular shell 46, as well as properly positioning the components and tube 74 within shell 46. Consequently, cam tube 74 and motor 100 will not be permitted to experience any longitudinal displacement within tubular shell 46 that in any way would affect their desired functioning.

The motor 100 is electrically connected to the pressure switch 24 through the insulated leads 118 and 120. The motor leads 118 are connected to the connecting wire leads 120 by means of conventional wire connectors 122. The connecting lead 120 extends through end plate 68 and is fixed therewith by a conventional electrical lead connector 124. Connector 124 may include member 126 having an externally threaded boss 128. Nut 130 is threadedly mounted on boss 128 and bears against the inner face of end plate 68. Resilient ring 132 embraces connecting wire 120 and is adapted to be immovably secured thereto by means of clamp 133. Wire lead 120 may terminate in an attachment plug 134 to be readily electrically connected to the pressure switch 24 which may have a companion plug-receiving socket hereinafter described.

The pressure switch 24 is commercially available and is known as Model M-1, Republic Shure-Vent Control, manufactured by the Autogas Company. For purposes of this invention, this conventional switch is slightly modified by the addition of a second contact point for actuating a warning device, which will be described shortly.

Figure 12:
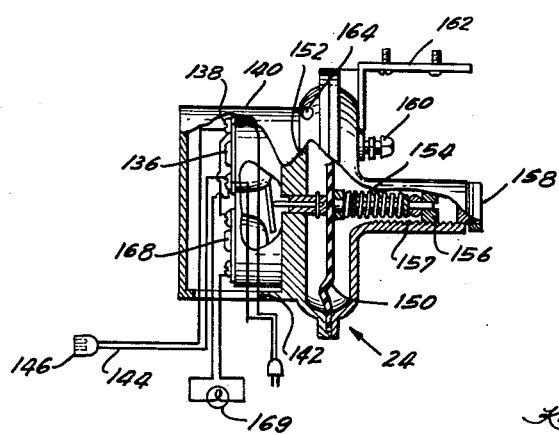
Fig. 12 is an elevational view partially in section of a pressure-sensitive diaphragm type switch usable with the present invention.

Referring now to Fig. 12, the pressure switch 24 comprises an electric single pole double throw switch 136 having terminals 138. The switch housing 140 has formed therein a drilled opening 142 for receiving the conduit electrical connection 144. The free end of conduit 144 is electrically connected to the plug-in type socket 146 which is adapted to receive plug 134. Additionally, the pressure switch 24 includes a diaphragm 150 mounting a diaphragm limiting sleeve 152. An adjusting spring 154 is coupled with the diaphragm 150 as well as adjusting plug 156. The adjusting plug 156 is threadedly engaged with internal threads 157 of pressure switch housing 140, substantially as shown. Plug 156 is adapted to change the tension of spring 154, and thus adjust the range of the pressure switch. The sealing cap and gasket 158 eliminates undesirable tampering of the adjustment of plug 156 and further functions to seal the interior of the switch housing 140.

A pipe tapping 160, communicating with the interior of switch housing 140 at one side of diaphragm 150, facilitates switch connection by means of tubing 161 to a source of positive or negative pressure, which, in our case, is at the upstream side of the expansible filter 20. Mounting bracket 162 is utilized to connect the pressure switch with either pipe brackets or a flat surface. A venting hole 164 is provided in switch housing 140 and is located on the other side of diaphragm 150 and can either be open to atmospheric pressure or vented to the downstream side of filter 20 by means of tubing 166.

Contained within the pressure switch 24 is an additional electrical switch 168 connected in parallel to switch 136. Switch 168 functions as a warning switch in that it is adapted to actuate a warning device such as a light 169 or bell in series therewith. Contact is made with this switch by the slight additional pressure experienced after the final expansion step of the expanding mechanism 22. This enables maintenance personnel to know when a filter pack change is necessary.

As a specific embodiment, assume the differential on the pressure switch 24 is set to .2 inch W.G. Further, the initial pressure drop across the filter when clean is .50 inch W.G. Then the pressure rises to .7 inch W.G. as the filter accumulates dirt. After the pressure has risen to .7 W.G., the pressure switch will operate and the filter will expand. After it has expanded, pressure across the filter will go down to approximately .55 inch W.G. Thereafter, every time the pressure drop across the filter reaches .7 inch W.G., an expansion will be made and the pressure drop will back down to approximately .55 inch W.G. This operation continues until the last expansion has been completed. The pressure drop after the last expansion will naturally rise to .7 inch W.G., but as there are no more possible expansion means remaining in the expansion mechanism 22 further expansion of the filter will not be effected. Consequently, the pressure drop will continue to rise above .7 inch W.G. and the second contact 168 in the pressure switch 24 will be caused to operate at approximately .72 inch W.G. Thus, the circuit is closed for energizing the selected warning device 169.

Where uniform air flow, without additional power being added, is desirable throughout the life of the filter, the pressure switch 24 would be set narrowly, as for example, at .04 inch W.G. On the other hand, where constant air flow was not a critical requirement, or if an increase of power were available as the pressure drop increases, then the pressure switch 24 could be set at its widest opening so that an expansion does not take place until the pressure drop reached, for example, 1 inch W.G.

Thus, among others, the aforementioned objects and advantages are effectively attained. Although a single practical embodiment has been disclosed, this is not to be taken in any sense as limiting, and therefore the scope of this invention will be defined by the appended claims.

I claim:

1. A camming means for use in actuating and controlling means for expansible filters comprising in combination: an elongated hollow tube, at least one washer having a bore therethrough mounted within said hollow tube and being coupled for rotation therewith, said washer having a radial slot extending from said bore to a location adjacent a peripheral edge portion of said washer; and a shaft having portions thereof disposed within said tube and shiftable in said bore, said shaft having a catch extending therefrom, and said catch adapted to abut against surfaces of said washer and adapted to pass freely through the slot in said washer.

2. A camming means for use in actuating and controlling means for expansible filters comprising in combination: an elongated hollow tube, at least one washer having a bore therethrough mounted within said hollow tube and being coupled for rotation therewith, said washer having a radial slot extending from said bore to a location adjacent a peripheral edge portion of said washer, and coupling means extending from said tube for connecting said tube to a source of rotational energy; and a shaft having portions thereof disposed within said tube and shiftable in said bore, said shaft having a catch extending therefrom, and said catch being cooperable to abut against surfaces of said washer and adapted to pass freely through the slot in said washer after a predetermined amount of rotation of said tube.

3. The invention in accordance with claim 2 wherein said source of rotational energy includes a motor.

4. The invention in accordance with claim 3, wherein a housing encases said tube, said motor and portions of said shaft.

5. The invention in accordance with claim 4, wherein said shaft is spring biased with respect to said housing for urging said catch through said slot when said catch is aligned with said slot.

6. The invention in accordance with claim 4, wherein a frame for mounting filter media is connected to said housing.

7. The invention in accordance with claim 6, wherein an expansible filter is mounted by said frame and coupled with said shaft, whereby said filter is expandable upon said catch passing through said slot.

8. The invention in accordance with claim 6, wherein grill work is coupled with said shaft and adapted to engage said media.

9. In combination with an expansible air filter having a first side and a second side, an expansion controlling means associated with such filter on said first side for regulating the expansion of said filter, and pressure sensitive actuating means electrically connected to said expansion controlling means, whereby a pressure differential encountered by said pressure sensitive means will cause said expansion controlling means to be actuated and said filter to be expanded towards said expansion controlling means.

10. In combination with an expansible air filter having an upstream side face and downstream side face, shiftable means coupled with and extending from said filter, rotatable means cooperable with said shiftable means and rotatable about an axis substantially normal to a major portion of said upstream side face and downstream side face, said rotatable means being operable to permit periodic shifting of said shifting means, and pressure sensitive actuating means for energizing said rotatable means when the air pressure at said upstream side face and at a second location provides a predetermined pressure differential.

11. In combination with an expansible air filter, a frame enclosing said filter, said filter being expandable within said frame, a housing secured to said frame, a rotatably mounted cam tube within said housing, a motor for rotatably driving said cam tube and being disposed within said housing, a shaft coupled with said filter and having portions thereof extending into said housing and said cam tube and further being relatively shiftable with respect thereto, said shaft presenting surfaces engageable with surfaces presented by said cam tube for cooperating to permit said shaft to shift relative to said tube to expand said filter upon predetermined rotation of said cam tube, and pressure-sensitive actuating means connected to said motor and being cooperable to energize said motor upon experiencing a preset pressure differential.

12. The invention in accordance with claim 11, wherein said filter includes a plurality of filter media.

13. The invention in accordance with claim 11, wherein said cam tube includes spaced slotted washers adapted to slidably receive said shaft, the washer slots being in a predetermined angular relationship with respect to each other, said shaft having a spring-biased catch extending therefrom, said catch adapted to abut against surfaces of said washers and adapted to pass freely through the slot in each washer.

14. The invention in accordance with claim 11, wherein a replaceable frame is contained within said first-defined frame, said filter being disposed within said replaceable frame, grill work being within said replaceable frame in bearing relationship with said filter and being coupled with said shaft.

15. The invention in accordance with claim 11, wherein signaling means are coupled with said pressure-sensitive actuating means for transmitting a signal upon said pressure-sensitive actuating means experiencing a higher pressure differential.

16. In combination with an expansible air filter having an upstream side face and a downstream side face, an expansion controlling means operatively coupled with such filter for regulating the expansion of said filter, electrical means coupled with said expansion controlling means for operating to actuate said expansion controlling means, and pressure sensitive actuating means coupled with said electrical means for energizing said electrical means when the air pressure on said upstream side face and at a second location provides a predetermined pressure differential to thereby cause said expansion controlling means to be actuated and said filter to be expanded in a direction substantially normal to one of the side faces of said filter.

References Cited in the file of this patent

UNITED STATES PATENTS

| | | |
|---|---|---|
| 247,459 | Wythe | Sept. 20, 1881 |
| 420,752 | Washburn | Feb. 4, 1890 |
| 1,186,378 | Christensen | June 6, 1916 |
| 2,034,373 | Bilde | Mar. 17, 1936 |
| 2,072,090 | Anderson | Mar. 2, 1937 |
| 2,325,184 | Jampoler | July 27, 1943 |